US012576625B2

(12) United States Patent
Tziovaras et al.

(10) Patent No.: US 12,576,625 B2
(45) Date of Patent: Mar. 17, 2026

(54) LAYER STRUCTURE FOR PRODUCING A HINGE, IN PARTICULAR FOR PRODUCING MULTI-LAYERED BOOK COVERS

(71) Applicant: Covestro Intellectual Property GmbH & Co. KG, Leverkusen (DE)

(72) Inventors: Georgios Tziovaras, Neuss (DE); Heinz Pudleiner, Krefeld (DE); Deivaraj Theivanayagam Chairman, Düsseldorf (DE); Helge Kosthorst, Visselhövede (DE); Christoph Koehler, Duisburg (DE); Norbert Hermanns, Krefeld (DE); Kira Planken, Goch (DE); Stefan Janke, Brüggen (DE)

(73) Assignee: Covestro Deutschland AG, Leverkusen (DE)

( * ) Notice: Subject to any disclaimer, the term of this patent is extended or adjusted under 35 U.S.C. 154(b) by 737 days.

(21) Appl. No.: 17/432,118

(22) PCT Filed: Mar. 3, 2020

(86) PCT No.: PCT/EP2020/055488
§ 371 (c)(1),
(2) Date: Aug. 19, 2021

(87) PCT Pub. No.: WO2020/178261
PCT Pub. Date: Sep. 10, 2020

(65) Prior Publication Data

US 2022/0184988 A1 Jun. 16, 2022

(30) Foreign Application Priority Data

Mar. 7, 2019 (EP) .................................... 19161307

(51) Int. Cl.
*B32B 3/14* (2006.01)
*B32B 3/10* (2006.01)
(Continued)

(52) U.S. Cl.
CPC ................ *B32B 27/40* (2013.01); *B32B 3/10* (2013.01); *B32B 3/14* (2013.01); *B32B 3/16* (2013.01);
(Continued)

(58) Field of Classification Search
CPC . B42D 3/02; B42D 3/06; B42D 25/24; B42D 25/36; B32B 3/266; B32B 27/40;
(Continued)

(56) References Cited

U.S. PATENT DOCUMENTS 3,023,192 A 2/1962 Shivers, Jr.
3,215,450 A * 11/1965 Peterson ................. B42D 3/00 281/29
(Continued)

FOREIGN PATENT DOCUMENTS

DE 2901774 A1 7/1980
DE 102005010364 A1 * 9/2006 ............ B42D 25/24
(Continued)

OTHER PUBLICATIONS

Translation to English for DE102008022016 A1 via espacenet. accessed Jun. 6, 2024. (Year: 2008).*
(Continued)

*Primary Examiner* — Jeffrey A Vonch
(74) *Attorney, Agent, or Firm* — Donald R. Palladino

(57) ABSTRACT

The present invention relates to a layer structure, preferably a hinge, particularly preferably a book cover, very particularly preferably a book cover for identification and security documents, comprising at least one outer layer a) containing at least one thermoplastic elastomer, preferably a thermoplastic polyurethane, and at least one layer b) containing at least one material selected from the group consisting of a polymer, a metal, a textile, a paper and a synthetic paper, or a combination of at least two of these, and also relates to a
(Continued)

laminate comprising the above layer structure and to the method for producing same. The invention further relates to the use of the layer structure and/or laminate for the production of a hinge, preferably a multilayer book cover, especially for security and identification documents.

20 Claims, 3 Drawing Sheets

(51) Int. Cl.

| | |
|---|---|
| ***B32B 3/16*** | (2006.01) |
| ***B32B 3/18*** | (2006.01) |
| ***B32B 3/22*** | (2006.01) |
| ***B32B 3/24*** | (2006.01) |
| ***B32B 3/26*** | (2006.01) |
| ***B32B 5/18*** | (2006.01) |
| ***B32B 7/022*** | (2019.01) |
| ***B32B 15/095*** | (2006.01) |
| ***B32B 27/06*** | (2006.01) |
| ***B32B 27/08*** | (2006.01) |
| ***B32B 27/10*** | (2006.01) |
| ***B32B 27/12*** | (2006.01) |
| ***B32B 27/20*** | (2006.01) |
| ***B32B 27/40*** | (2006.01) |
| ***B32B 37/06*** | (2006.01) |
| ***B32B 37/10*** | (2006.01) |
| ***B32B 38/06*** | (2006.01) |
| ***B42D 3/02*** | (2006.01) |
| ***B42D 3/06*** | (2006.01) |
| ***B42D 25/20*** | (2014.01) |
| ***B42D 25/24*** | (2014.01) |
| ***B42D 25/36*** | (2014.01) |
| *B32B 5/02* | (2006.01) |
| *B32B 15/04* | (2006.01) |
| *B32B 37/00* | (2006.01) |
| *B32B 38/00* | (2006.01) |
| *B32B 38/14* | (2006.01) |
| *B42D 3/00* | (2006.01) |
| *B42D 25/373* | (2014.01) |
| *B42D 25/455* | (2014.01) |
| *B42D 25/46* | (2014.01) |
| *G06K 19/02* | (2006.01) |
| *G06K 19/077* | (2006.01) |

(52) U.S. Cl.

CPC .................. *B32B 3/18* (2013.01); *B32B 3/22* (2013.01); *B32B 3/266* (2013.01); *B32B 5/18* (2013.01); *B32B 7/022* (2019.01); *B32B 15/095* (2013.01); *B32B 27/06* (2013.01); *B32B 27/065* (2013.01); *B32B 27/08* (2013.01); *B32B 27/10* (2013.01); *B32B 27/12* (2013.01); *B32B 27/20* (2013.01); *B32B 37/06* (2013.01); *B32B 37/10* (2013.01); *B32B 38/06* (2013.01); *B42D 3/02* (2013.01); *B42D 3/06* (2013.01); *B42D 25/24* (2014.10); *B42D 25/36* (2014.10); *B32B 5/02* (2013.01); *B32B 15/04* (2013.01); *B32B 37/00* (2013.01); *B32B 38/14* (2013.01); *B32B 38/145* (2013.01); *B32B 2250/05* (2013.01); *B32B 2250/44* (2013.01); *B32B 2266/0278* (2013.01); *B32B 2305/022* (2013.01); *B32B 2307/4023* (2013.01); *B32B 2307/4026* (2013.01); *B32B 2307/536* (2013.01); *B32B 2307/732* (2013.01); *B32B 2317/12* (2013.01); *B32B 2375/00* (2013.01); *B42D 3/002* (2013.01); *B42D 25/20* (2014.10); *B42D 25/373* (2014.10); *B42D 25/455* (2014.10); *B42D 25/46* (2014.10); *G06K 19/025* (2013.01); *G06K 19/07722* (2013.01); *G06K 19/07728* (2013.01); *G06K 19/07749* (2013.01); *Y10T 428/183* (2015.01); *Y10T 428/24314* (2015.01); *Y10T 428/24331* (2015.01); *Y10T 428/24752* (2015.01); *Y10T 428/24983* (2015.01)

(58) Field of Classification Search

CPC .... B32B 2266/0278; B32B 2307/4023; B32B 2307/4026; B32B 2307/536; B32B 2307/732; B32B 5/18; B32B 3/10; B32B 15/095; B32B 27/065

See application file for complete search history.

(56) References Cited

U.S. PATENT DOCUMENTS

| | | | | | |
|---|---|---|---|---|---|
| 3,485,787 | A | | 12/1969 | Walter et al. | |
| 3,766,146 | A | | 10/1973 | Witsiepe | |
| 3,823,031 | A | | 7/1974 | Tubbs et al. | |
| 4,006,116 | A | | 2/1977 | Dominguez | |
| 4,039,629 | A | | 8/1977 | Himes et al. | |
| 4,169,867 | A | | 10/1979 | Burg et al. | |
| 4,207,410 | A | | 6/1980 | Burzin et al. | |
| 4,218,549 | A | | 8/1980 | Jadamus et al. | |
| 4,230,838 | A | | 10/1980 | Foy et al. | |
| 4,238,582 | A | | 12/1980 | Deleens et al. | |
| 4,252,920 | A | | 2/1981 | Deleens et al. | |
| 4,332,920 | A | | 6/1982 | Foy et al. | |
| 4,438,240 | A | | 3/1984 | Tanaka et al. | |
| 5,660,919 | A | * | 8/1997 | Vallee | D21H 19/62 162/134 |
| 2003/0057286 | A1 | * | 3/2003 | Yamagishi | G06K 19/07728 235/492 |
| 2003/0108735 | A1 | * | 6/2003 | Hoppe | F24S 20/55 428/212 |
| 2003/0168514 | A1 | * | 9/2003 | Rancien | G06K 19/07749 235/492 |
| 2005/0247794 | A1 | * | 11/2005 | Jones | B42D 25/21 235/487 |
| 2006/0198987 | A1 | * | 9/2006 | Grob | B32B 27/10 428/137 |
| 2006/0202795 | A1 | * | 9/2006 | Hoeppner | G06K 19/07745 340/5.8 |
| 2007/0141760 | A1 | * | 6/2007 | Ferguson | H01L 24/97 257/E23.178 |
| 2007/0182154 | A1 | * | 8/2007 | Hoeppner | B42D 25/46 283/72 |
| 2007/0252705 | A1 | * | 11/2007 | Halope | G06K 19/0775 257/679 |
| 2007/0257797 | A1 | * | 11/2007 | Rancien | G06K 19/07749 340/572.1 |
| 2008/0131669 | A1 | * | 6/2008 | Michalk | B32B 27/12 428/196 |
| 2008/0169638 | A1 | * | 7/2008 | Beyer-Meklenburg | B42D 25/47 281/38 |
| 2008/0193713 | A1 | * | 8/2008 | Hahn | B42D 25/47 156/227 |
| 2009/0315320 | A1 | * | 12/2009 | Finn | H01Q 1/38 156/196 |
| 2010/0276495 | A1 | * | 11/2010 | Goldstein | B42D 25/47 235/488 |
| 2010/0295286 | A1 | * | 11/2010 | Goldstein | B42D 3/12 156/78 |
| 2011/0274883 | A1 | * | 11/2011 | Lowe | G06K 19/07745 428/521 |
| 2012/0187672 | A1 | * | 7/2012 | Sakagami | B32B 27/02 281/38 |
| 2012/0319394 | A1 | * | 12/2012 | Christen | G06K 19/025 281/38 |

(56) References Cited

U.S. PATENT DOCUMENTS

| | | | | |
|---|---|---|---|---|
| 2013/0273309 | A1 | 10/2013 | Schaefer | |
| 2014/0103118 | A1* | 4/2014 | Ripert | G06K 19/025 29/601 |
| 2014/0265295 | A1* | 9/2014 | Rhyner | B42D 25/46 156/60 |
| 2014/0326789 | A1* | 11/2014 | Lim | B32B 5/26 235/488 |
| 2015/0227829 | A1* | 8/2015 | Finn | B42D 25/24 438/118 |
| 2015/0352880 | A1* | 12/2015 | Pudleiner | B32B 27/40 428/190 |
| 2019/0009607 | A1* | 1/2019 | Motoi | B42D 25/46 |
| 2019/0092080 | A1* | 3/2019 | Sugdon | B42D 25/351 |
| 2019/0286964 | A1* | 9/2019 | Shimai | G06K 19/07758 |
| 2020/0316984 | A1* | 10/2020 | Nolan | B42D 25/45 |

FOREIGN PATENT DOCUMENTS

| | | | | | |
|---|---|---|---|---|---|
| DE | 102006011388 | A1 | | 9/2007 | |
| DE | 102007004674 | A1 | | 7/2008 | |
| DE | 102008022016 | A1 | * | 11/2009 | G06K 19/025 |
| DE | 102008025075 | A1 | * | 12/2009 | B42B 2/00 |
| DE | 102013105023 | A1 | * | 12/2014 | B42D 25/24 |
| DE | 102014110582 | A1 | | 1/2016 | |
| DE | 102014110585 | A1 | * | 1/2016 | B32B 29/00 |
| EP | 1732033 | A1 | * | 12/2006 | G06K 19/07749 |
| EP | 1790496 | A1 | | 5/2007 | |
| EP | 2287012 | A1 | * | 2/2011 | B32B 3/02 |
| JP | H0271540 | U | * | 5/1990 | |
| JP | 2005313520 | A | * | 11/2005 | |
| JP | 2009140027 | A | * | 6/2009 | |
| JP | 2012137807 | A | * | 7/2012 | |
| JP | 2012187847 | A | * | 10/2012 | |
| JP | 2013043305 | A | * | 3/2013 | B32B 37/10 |
| JP | 2015069537 | A | * | 4/2015 | |
| KR | 200410625 | Y1 | * | 3/2006 | B42D 3/02 |
| WO | WO-2006005396 | A1 | * | 1/2006 | B42D 25/305 |
| WO | WO-2006054072 | A1 | * | 5/2006 | B42D 25/24 |
| WO | WO-2006054097 | A1 | * | 5/2006 | G06K 19/025 |
| WO | WO-2007131383 | A1 | * | 11/2007 | B42D 25/305 |

OTHER PUBLICATIONS

Machine Translation of DE102008025075A1, Dec. 2009 (Year: 2009).*

Machine Translation of JP2013043305A, Mar. 2013 (Year: 2013).*

BASF, Thermoplastic Polyurethane Elastomers, Sep. 2017 (Year: 2017).*

Houben-Weyl "Methoden der organischen Chemie" [Methods of Organic Chemistry], vol. E20 "Makromolekulare Stoffe" [Macromolecular Materials], Georg Thieme Verlag, Stuttgart, New York 1987, pp. 1587-1593.

Justus Liebigs Annalen der Chemie, 562, pp. 75 to 136.

International Search Report, PCT/EP2020/055488, date of mailing: Mar. 17, 2020, Authorized officer: Qianqian Yu.

* cited by examiner

LAYER STRUCTURE FOR PRODUCING A HINGE, IN PARTICULAR FOR PRODUCING MULTI-LAYERED BOOK COVERS

CROSS-REFERENCE TO RELATED APPLICATION

This application is a national stage application under 35 U.S.C. § 371 of PCT/EP2020/055488, filed Mar. 3, 2020, which claims the benefit of European Application No. 19161307.4, filed Mar. 7, 2019, each of which is incorporated herein by reference.

FIELD

The present invention relates to a layer structure, preferably a hinge, particularly preferably a book cover, very particularly preferably a book cover for identification and security documents, comprising at least one outer layer a) containing at least one thermoplastic elastomer, preferably a thermoplastic polyurethane, and at least one layer b) containing at least one material selected from the group consisting of a polymer, a metal, a textile, a paper and a synthetic paper, or a combination of at least two of these, and also relates to a laminate comprising the above layer structure and to the method for producing same. The invention further relates to the use of the layer structure and/or laminate for the production of a hinge, preferably a multilayer book cover, especially for security and identification documents.

BACKGROUND

Layer structures made from plastics layers enable a multiplicity of applications in various sectors; working without layer structures is unimaginable in particular in the sector of security and identification documents. In particular for providing hinges, very particularly for producing multilayer book covers, it is important that the hinge has a particularly long life even after multiple opening and closing operations. It is also desirable to embed diverse functionalities into this layer structure. In particular in the field of security and identification documents, a great demand can be expected for such documents which reliably fulfil their function with regards to embedded security features and electronics and at the same time also offer protection against damage, counterfeiting and wear and tear. An example of such a security and identification document is a passport, in the case of which, in particular when there is the appearance of major wear and tear, it can be difficult to check whether this passport has been subject to a counterfeiting attempt or not.

The passport book cover plays a particular role in the security and longevity of a passport. The electronic part of a passport is usually incorporated into the passport book cover. In addition, the data page, which in many passports consists of paper and contains important security features of the passport (e.g. photo of the passport holder or a hologram), is protected in the passport.

Passport manufacturers can choose from a multiplicity of materials which may be used for the manufacture of book covers. These materials are generally multilayer composites formed from plastics films, textiles, paper and other materials which are obtained in the form of sheets or in the form of rolls. These materials impart color, grain and tactile properties to the book cover produced with them. The underlying material layers serve to reinforce the book cover in order possibly to accommodate electronic security elements such as for example a chip module or an antenna and in order to increase the tear resistance of the passport book cover, for example by incorporating fabrics or plastics films.

When choosing the external layer of a passport book cover, the color, printability, tactile properties, grain and also resistance to wear and tear have to be taken into account. The desired properties of the book cover can often not be adequately achieved with one material or even a plurality of material layers.

For instance, sufficient resistance to wear and tear can be achieved only with difficulty with a textile ply, and high-quality tactile properties of leather cannot be achieved with a relatively hard and less grainy external layer.

Accordingly, passport manufacturers have to use various materials in order to be able to meet the criteria of their customers. This increases the manufacturing complexity and thus the manufacturing costs. The complexity is increased further when a chip module and/or an antenna for contactless data transfer are intended to be integrated into the passport book cover. For this, a further layer is needed, usually a plastics film, which has to have an opening which corresponds to the position of the chip module and in which the chip can be received. Due to this complexity, passport book covers are produced in parallel manufacturing steps. The part of the passport book cover comprising the chip and antenna, referred to as an "inlay", is usually produced separately. The prefabricated inlay and the remaining layers of the passport book cover are later joined by lamination under the action of pressure and heat.

DE-A 102006011388 discloses the manufacture of a multilayer passport book cover by lamination. Additional layers of adhesive are used to hold the laminate together. The fiber layer 18 needs to be stamped out in the region of the chip module. The cover layers 23, 24, 26 have the specified color, grain and tactile properties.

EP-A 1790496 discloses the manufacture of a passport book cover in which a layer of polyurethane is placed between two external layers and is laminated under the action of pressure and temperature. The polyurethane layer acts as an adhesive layer for the external layers. The color, the grain and the tactile properties are predetermined by the external layers. Separate manufacturing steps have to be carried out for embedding the electronics.

WO-A 2010132117 discloses the manufacture of a passport book cover in which the unevenness caused by the chip module is compensated by a polyurethane foam. The polyurethane foam also serves as an adhesive between two layers. This is a particularly complex process, as the foam is formed by mixing two liquid components that are applied to the surfaces to be bonded via a nozzle. The cover layer 19 has predetermined color, grain, and tactile properties.

The multilayer structures described to date involve quite complex production processes and the desired requirements cannot always be realized simply and without a loss of properties.

SUMMARY

It was therefore an object of the present invention to provide a layer structure, in particular for hinges, preferably for book covers, very particularly preferably for book covers of identification or security documents, which enables a large number of different requirement profiles using few base materials and is also easy to process. In particular in the case of book covers for identification or security documents, it should be possible, aside from color, grain and tactile properties, to also embed electronic security elements, such as for example chip modules or antennae, in a simple manner into the book cover by lamination. In addition, the layer structure, in particular for hinges, preferably for book covers, very particularly preferably for book covers of identification or security documents, should constitute an improvement over the passport book covers known from the prior art in terms of mechanical characteristics such as for example tear resistance, bond adhesion of the individual layers, and abrasion resistance.

Another object of the invention is to provide a layer structure, in particular for hinges, preferably for book covers, very particularly preferably for book covers of identification or security documents, which has a long service life.

A further object of the invention is to provide a layer structure, in particular for hinges, preferably for book covers, very particularly preferably for book covers of identification or security documents, which is at least partially constructed from transparent or translucent materials. In particular, it was an object to adequately protect printed layers of the layer structure while still making them visible from the outside.

Surprisingly, this object was achieved with a layer structure, preferably a hinge, particularly preferably a book cover, very particularly preferably a book cover for identification or security documents, comprising at least one outer layer a) containing at least one thermoplastic elastomer, in particular a thermoplastic polyurethane, preferably a thermoplastic polyurethane having a hardness of ≥60 Shore A according to DIN ISO 7619-1 to ≤95 Shore D according to DIN ISO 7619-1, particularly preferably having a hardness of ≥70 Shore A according to DIN ISO 7619-1 to ≤95 Shore A according to DIN ISO 7619-1, and at least one layer b) containing at least one material selected from the group consisting of a thermoplastic polymer, a metal, a textile, a paper and a synthetic paper, or a combination of at least two of these, particularly preferably at least one textile, one paper and/or one synthetic paper.

BRIEF DESCRIPTION OF THE DRAWINGS

Various features and characteristics of the inventions described in this specification may be better understood by reference to the accompanying figures, in which.

DETAILED DESCRIPTION

Figure 1:
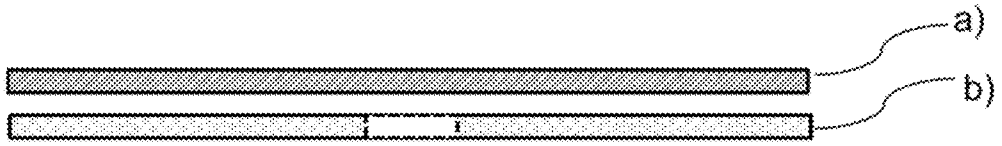
FIG. 1 shows the layer sequence of example 1 before lamination.

The layer a) can consist of a single film or a composite of at least two films. Preferably, at least one of the films includes at least the thermoplastic elastomer, very particularly preferably at least two or all films. The film in layer a) which contains the thermoplastic elastomer is preferably the outermost film in the layer structure.

Thermoplastic elastomers are materials containing elastomeric phases in thermoplastically processable polymers in either physically mixed-in or chemically incorporated form. A distinction is made between polyblends in which the elastomeric phases are physically mixed in and block copolymers in which the elastomeric phases are part of the polymer skeleton. As a result of the structure of the thermoplastic elastomers, hard and soft regions are present next to each other. The hard regions form a crystalline network structure or a continuous phase the interstices of which are filled with elastomeric segments. Because of this structure, these materials have rubber-like properties.

The thermoplastic elastomer is preferably selected from the group consisting of a thermoplastic copolyamide (TPE-A), in particular a polyether block amide, a thermoplastic polyurethane (TPE-U), a thermoplastic polyester elastomer (TPE-E), a styrene block copolymer (TPE-S), TPE-V—vulcanized (crosslinked) PP/EPDM compounds, or a mixture of at least two of these.

The thermoplastic copolyamide (TPE-A) can be any copolyamide that a person skilled in the art would select for a layer structure, in particular polyether block amides (PEBAs). Preferred polyether block amides are for example those which consist of polymer chains which are formed from repeating units corresponding to formula 0.

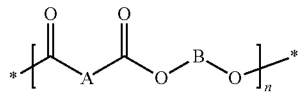

(0)

in which

A is the polyamide chain derived from a polyamide having 2 carboxyl end groups via the loss of the latter and B is the polyoxyalkylene glycol chain derived from a polyoxyalkylene glycol having terminal OH groups via the loss of the latter, and n is the number of units forming the polymer chain. The end groups here are preferably OH groups or moieties of compounds which terminate the polymerization.

The dicarboxylic polyamides having the terminal carboxyl groups are obtained in a known way, for example by polycondensation of one or more lactams or/and one or more amino acids, or also by polycondensation of a dicarboxylic acid with a diamine, in each case in the presence of an excess of an organic dicarboxylic acid preferably having terminal carboxyl groups. These carboxylic acids become part of the polyamide chain during the polycondensation and undergo addition in particular at the ends of this chain, as a result of which a polyamide having μ-dicarboxylic-acid functionality is obtained. The dicarboxylic acid also acts as a chain terminator, which is why it is also used in excess.

The polyamide can be obtained starting from lactams and/or amino acids having a hydrocarbon chain consisting of 4-14 carbon atoms, such as, for example, from caprolactam, oenantholactam, dodecalactam, undecanolactam, decanolactam, 11-aminoundecanoic or 12-aminododecanoic acid.

Examples of polyamides, as are formed by the polycondensation of a dicarboxylic acid with a diamine, which can be mentioned include the condensation products of hexamethylenediamine with adipic, azelaic, sebacic and 1,12-dodecanedioic acid, and the condensation products of nonamethylenediamine and adipic acid.

Useful dicarboxylic acids that can be used for the synthesis of the polyamide, that is to say, firstly used for attaching in each case one carboxyl group to each end of the polyamide chain and secondly used as chain terminator, include those having 4-20 carbon atoms, in particular alkanedioic acids, such as succinic, adipic, suberic, azelaic, sebacic, undecanedioic or dodecanedioic acid, and additionally cycloaliphatic or aromatic dicarboxylic acids such as terephthalic or isophthalic or cyclohexane-1,4-dicarboxylic acid.

The polyoxyalkylene glycols having terminal OH groups are unbranched or branched and have an alkylene radical comprising at least 2 carbon atoms. In particular, these are polyoxyethylene, polyoxypropylene and polyoxytetramethylene glycol, and copolymers thereof.

The average molecular weight of these OH group-terminated polyoxyalkylene glycols can vary within a wide range; it is advantageously between 100 and 6000, in particular between 200 and 3000.

The proportion by weight of the polyoxyalkylene glycol, based on the total weight of the polyoxyalkylene glycol and dicarboxylic polyamide used to produce the PEBA polymer, is preferably 5-85% by weight, preferably 10-50% by weight.

Processes for synthesizing such PEBA polymers are known from FR-C 7 418 913, DE-A 28 02 989, DE-A 28 37 687, DE-A 25 23 991, EP-A 095 893, DE-A 27 12 987 and DE-A 27 16 004.

Particularly suitable are those PABA polymers which, in contrast to those described above, have a random structure. To produce these polymers, a mixture of 1. one or more polyamide-forming compounds from the group of aminocarboxylic acids or lactams having at least 10 carbon atoms,
2. an α,ω-dihydroxypolyoxyalkylene glycol,
3. at least one organic dicarboxylic acid in a 1:(2+3) ratio by weight of between 30:70 and 98:2, where hydroxyl groups and carbonyl groups are present in equivalent amounts in (2+3), is heated in the presence of 2% to 30% by weight of water, based on the polyamide-forming compounds of group 1, under autogenous pressure, at temperatures of between 23° C. and 30° C., and is then further treated after removal of the water, with exclusion of oxygen, at standard pressure or at reduced pressure, at 250 to 280° C.

Such preferably suitable PEBA polymers are described in DE-A 27 12 987, for example.

Suitable and preferably suitable PEBA polymers are available for example under the trade names PEBAX, from Atochem, Pebax® 5010, Pebax® 5020, Pebax® 5030, Pebax® 5040, Pebax® 5070 from Arkema (Germany), Vestamid from Hüls AG, Grilamid from EMS-Chemie and Kellaflex from DSM.

The polyether block amides according to the invention, comprising active ingredients, may additionally contain the additives which are customary for plastics. Examples of typical additives include pigments, stabilizers, flow agents, lubricants and demolding agents.

Examples of thermoplastic copolyamides which may be mentioned include products such as Pebax® 5010, Pebax® 5020, Pebax® 5030, Pebax® 5040, Pebax® 5070 from Arkema (Germany). Examples of thermoplastic polyurethanes are given below.

The thermoplastic polyester elastomer (TPE-E) can be any polyester elastomer that a person skilled in the art would select for a layer structure; the polyester elastomers are preferably copolyesters. Suitable copolyesters (segmented polyester elastomers) are formed, for example, from a large number of repeating short-chain ester units and long-chain ester units which are combined by ester bonds, where the short-chain ester units make up about 15-65% by weight of the copolyester and have the formula (I):

(I)

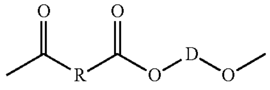

in which

R is a divalent dicarboxylic acid moiety which has a molecular weight of less than about 350, D is a divalent organic diol moiety which has a molecular weight of less than about 250;

the long-chain ester units make up about 35-85% by weight of the copolyester and have the formula (II)

(II)

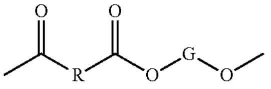

in which

R is a divalent dicarboxylic acid moiety which has a molecular weight of less than about 350, G is a divalent long-chain glycol moiety which has an average molecular weight of about 350 to 6000. Examples of thermoplastic polyester elastomers (TPE-E) are DuPont™ Hytrel® 5556 or DuPont™ Hytrel® PC966 NC010 (DuPont, Wilmington, DE 19880-0709).

The copolyesters which can preferably be used can be prepared by copolymerizing a) one or more dicarboxylic acids, b) one or more linear, long-chain glycols and c) one or more low molecular weight diols.

The dicarboxylic acids for the production of the copolyester are aromatic acids having 8-16 carbon atoms, in particular phenylenedicarboxylic acids such as phthalic, terephthalic and isophthalic acid.

The low molecular weight diols for the reaction to form the short-chain ester units of the copolyesters belong to the classes of acyclic, alicyclic and aromatic dihydroxy compounds. The preferred diols have 2-15 carbon atoms, such as ethylene, propylene, tetramethylene, isobutylene, pentamethylene, 2,2-dimethyltrimethylene, hexamethylene and decamethylene glycols, dihydroxycyclohexane, cyclohexanedimethanol, resorcinol, hydroquinone and the like. Bisphenols for the present purpose include bis(p-hydroxy) diphenyl, bis(p-hydroxyphenyl)methane, bis(p-hydroxyphenyl)ethane and bis(p-hydroxyphenyl)propane.

The long-chain glycols used to produce the soft segments of the copolyesters preferably have molecular weights of about 600-3000. These include poly(alkylene ether) glycols in which the alkylene groups have 2-9 carbon atoms.

Glycol esters of poly(alkylene oxide)dicarboxylic acids or polyester glycols can also be used as long-chain glycol.

The long-chain glycols also include polyformals, which are obtained by reacting formaldehyde with glycols. Polythioether glycols are also suitable. Polybutadiene glycols and polyisoprene glycols, copolymers of the same, and saturated hydrogenation products of these materials are satisfactory long-chain polymeric glycols.

Processes for synthesizing such copolyesters are known from DE-A 2 239 271, DE-A 2 213 128, DE-A 2 449 343 and U.S. Pat. No. 3,023,192.

The copolyesters can also contain the additives which are customary for plastics. Examples of typical additives are lubricants, such as fatty acid esters, metal soaps thereof, fatty acid amides and silicone compounds, antiblocking agents, inhibitors, stabilizers against hydrolysis, light, heat and discoloration, flame retardants, dyes, pigments, inorganic or organic fillers, and reinforcers. Reinforcers are especially fibrous reinforcing materials, for example inorganic fibers which are produced according to the prior art and may also have been sized. Further information about the auxiliaries and additives mentioned may be found in the specialist literature, for example J. H. Saunders, K. C. Frisch: "High Polymers", volume XVI, Polyurethane, part 1 and 2, Interscience Publishers 1962 and 1964, R. Gächter, H. Müller (Ed.): Taschenbuch der Kunststoff-Additive [Handbook of Plastics Additives], 3rd edition, Hanser Verlag, Munich 1989, or DE-A 29 01 774.

The thermoplastic styrene block copolymer (TPE-S) can be any styrene block copolymer that a person skilled in the art would select for a layer structure. The styrene-butylene block copolymers which can preferably be used consist of a polyethylene-butylene rubber middle block with a polystyrene end block chemically coupled at both ends. The polystyrene content is less than 30%. The polystyrene end blocks are uniformly distributed as spherical polystyrene domains in the ethylene rubber matrix.

Processes for synthesizing suitable styrene block copolymers are known, for example, from U.S. Pat. Nos. 3,485,787, 4,006,116 and 4,039,629.

The styrene block copolymers can also contain the additives which are customary for plastics. Examples of typical additives include pigments, stabilizers, flow agents, lubricants and demolding agents.

Examples of styrene block copolymers (TPE-S) are Elastron G, such as Elastron G100 and G101, Elastron D, such as Elastron D100 and D101 from Elastron (Turkey) and Kraton™ D SIBS from Kraton Polymers (USA), Septon™, especially Septon™ Q1250 or Septon™ V9461 from Kuraray (Japan), Styroflex® 2G66 from Ineos Styrolution Group GmbH (Germany), Thermolast® K from Kraiburg TPE (Germany) and Saxomer® TPE-S from PCW GmbH (Germany). Further suitable styrene-butylene block copolymers are available, for example, under the trade names 'Kraton G and'Elexar from Shell Chemie GmbH.

The thermoplastic, vulcanized (crosslinked) PP/EPDM compound can be any PP/EPDM compound that a person skilled in the art would select for a layer structure. Examples of PP/EPDM compounds are Santoprene™ (from Exxon Mobil) or Sarlink® (from DSM).

The material of the at least one outer layer a) is preferably translucent or transparent; the material of the at least one outer layer a) is particularly preferably transparent.

It is a feature of the layer structure according to the invention that the color, grain and tactile properties of the exterior layer can be individually realized. In addition, the layer structures according to the invention after lamination not only have high bond adhesion but also very good mechanical stabilities with regard to tear resistance and abrasion resistance. The layer structures according to the invention also exhibit these properties over a period of several years. Furthermore, the layer structures according to the invention have a self-closing function after lamination and folding.

In addition, the layer structure can preferably emit odors, such as a leather odor, by way of the addition of aromas to layer a). Layer a) preferably includes aromas such as LEATHER WOODY from Drom or SUEDERAL IFF from Ventos in an amount in a range from 0.1% to 1% by weight, preferably in a range from 0.2% to 0.8% by weight, particularly preferably in a range from 0.3% to 0.7% by weight, based on the total weight of the layer a).

In one embodiment, the layer structure, preferably the hinge, particularly preferably the book cover, very particularly preferably the book cover for identification or security documents, has a length x and a width y, the at least one layer b) having at least one cutout of any desired form.

In another embodiment, the cutout in the layer b) of the layer structure as described above has the form of a parallelogram which runs parallel to a line of symmetry of the length x or of the width y, preferably the parallelogram has a width of ≥0.1 mm to ≤100 mm, preferably of ≥1.0 mm to ≤50 mm, particularly preferably of ≥1.5 mm to ≤30 mm, very particularly preferably the parallelogram extends over the entire length x or over the entire width y.

In a further embodiment of the above layer structure, the at least one cutout in the layer b) is formed over a width of ≥0.1 mm to ≤100 mm, preferably of ≥1.0 mm to ≤50 mm, particularly preferably of ≥1.5 mm to ≤30 mm, and particularly preferably over the entire length of the layer structure, or the cutout in layer b) is arranged in the form of at least two sections on the layer a), so that between the at least two sections at least one cutout which is not covered by the layer b) is formed on the layer a), and wherein the at least one cutout is preferably formed over a length of ≥0.1 mm to ≤100 mm, preferably of ≥1.0 mm to ≤50 mm, particularly preferably of ≥1.5 mm to ≤30 mm, and particularly preferably over the entire width of the layer structure.

In a further embodiment of the layer structure described above, the layer b) can comprise one or more further cutouts of any desired form.

The outer layer a) of the layer structure according to the invention contains at least one thermoplastic polymer, preferably a thermoplastic elastomer, as already described. The thermoplastic polymer preferably has a hardness of ≥60 Shore A according to DIN ISO 7619-1 to ≤95 Shore D according to DIN ISO 7619-1, particularly preferably a hardness of ≥70 Shore A according to DIN ISO 7619-1 to ≤95 Shore A according to DIN ISO 7619-1.

In a preferred embodiment of the layer structure, the outer layer a) contains at least one thermoplastic polyurethane (TPU), preferably a TPU having a hardness of ≥60 Shore A according to DIN ISO 7619-1 to ≤95 Shore D according to DIN ISO 7619-1, particularly preferably having a hardness of ≥70 Shore A according to DTN ISO 7619-1 to ≤95 Shore A according to DIN ISO 7619-1.

The outer layer a) preferably contains a thermoplastic polyurethane in an amount in a range from 50% to 100% by weight, more preferably in a range from 60% to 95% by weight, particularly preferably in a range from 70% to 85% by weight, based on the total weight of the layer a).

Depending on the organic diisocyanates used, TPUs can have aliphatic or aromatic character. TPUs typically have a block or segment construction. A basic distinction is made between hard segments and soft segments. Hard segments are formed from the organic diisocyanates used for reaction and short-chain compounds having two to three hydroxyl, amino, thiol or carboxyl groups, preferably compounds having two hydroxyl, amino, thiol or carboxyl groups, particularly preferably diols, having an average molecular weight of 60 to 500 g/mol. Soft segments are formed from the organic diisocyanates used for reaction and long-chain compounds having two to three hydroxyl, amino, thiol or carboxyl groups, preferably compounds having two hydroxyl, amino, thiol or carboxyl groups, particularly preferably diols, having an average molecular weight of ≥500 and ≤5000.

Hard segments contribute strength and upper use temperatures to the profiles of properties of the TPUs; soft segments contribute elastic properties and cold flexibility to the material properties of the TPUs.

Both for the hard segments and for the soft segments, organic diisocyanates used may be aromatic, aliphatic, araliphatic, heterocyclic and cycloaliphatic diisocyanates or mixtures of these diisocyanates (cf. HOUBEN-WEYL "Methoden der organischen Chemie" [Methods of Organic Chemistry], volume E20 "Makromolekulare Stoffe" [Macromolecular Materials], Georg Thieme Verlag, Stuttgart, New York 1987, pp. 1587-1593 or Justus Liebigs Annalen der Chemie, 562, pages 75 to 136).

Specific examples include: aliphatic diisocyanates such as hexamethylene diisocyanate, cycloaliphatic diisocyanates such as isophorone diisocyanate, cyclohexane 1,4-diisocyanate, 1-methylcyclohexane 2,4-diisocyanate and 1-methylcyclohexane 2,6-diisocyanate and the corresponding isomer mixtures, dicyclohexylmethane 4,4'-diisocyanate, dicyclohexylmethane 2,4'-diisocyanate and dicyclohexylmethane 2,2'-diisocyanate and the corresponding isomer mixtures, aromatic diisocyanates such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates and diphenylmethane 2,4'-diisocyanates, 4,4'-diisocyanato-1,2-diphenylethane and naphthylene 1,5-diisocyanate. Preference is given to using hexamethylene 1,6-diisocyanate, isophorone diisocyanate, dicyclohexylmethane 4,4'-diisocyanate, diphenylmethane diisocyanate isomer mixtures having a diphenylmethane 4,4'-diisocyanate content of >96% by weight and especially diphenylmethane 4,4'-diisocyanate and naphthylene 1,5-diisocyanate. These diisocyanates can be used individually or in the form of mixtures with one another. They can also be used together with up to 15% by weight (based on the total amount of diisocyanate) of a polyisocyanate, for example triphenylmethane 4,4',4"-triisocyanate or polyphenylpolymethylene polyisocyanates. Particularly preferred organic diisocyanates are, for example, diphenylmethane 4,4'-diisocyanate, hydrogenated diphenylmethane 4,4'-diisocyanate, toluene 2,4-diisocyanate and hexamethylene diisocyanate.

The preferred short-chain diols having a molecular weight of 60 to 500 g/mol are preferably aliphatic diols having 2 to 14 carbon atoms, for example ethanediol, propane-1,2-diol, propane-1,3-diol, butane-1,4-diol, butane-2,3-diol, pentane-1,5-diol, hexane-1,6-diol, diethylene glycol and dipropylene glycol. Also suitable, however, are diesters of terephthalic acid with glycols having 2 to 4 carbon atoms, for example bis(ethylene glycol) terephthalate or bis(butane-1,4-diol) terephthalate, hydroxyalkylene ethers of hydroquinone, for example 1,4-di(β-hydroxyethyl)hydroquinone, ethoxylated bisphenols, for example 1,4-di(β-hydroxyethyl)bisphenol A, (cyclo)aliphatic diamines, such as isophoronediamine, ethylenediamine, propylene-1,2-diamine, propylene-1,3-diamine, N-methylpropylene-1,3-diamine, N,N'-dimethylethylenediamine and aromatic diamines such as tolylene-2,4-diamine, tolylene-2,6-diamine, 3,5-diethyltolylene-2,4-diamine or 3,5-diethyltolylene-2,6-diamine or primary mono-, di-, tri- or tetraalkyl-substituted 4,4'-diaminodiphenylnethanes. Particular preference is given to using ethanediol, propane-1,2-diol, propane-1,3-diol, butane-1,4-diol, hexane-1,6-diol, ethylene glycol, diethylene glycol, 1,4-di(β-hydroxyethyl)hydroquinone or 1,4-di(β-hydroxyethyl) bisphenol A. It is also possible to use mixtures of the abovementioned compounds. In addition, it is also possible to add relatively small amounts of triols.

The long-chain compounds having two to three hydroxyl, amino, thiol or carboxyl groups, preferably compounds having two hydroxyl, amino, thiol or carboxyl groups, particularly preferably diols, having a number-average molecular weight of ≥500 and ≤5000 may be divided into two main groups: polyether diols and polyester diols. The polyether diols are based, for example, on polytetrahydrofuran, polyethylene oxide and polypropylene oxide, and mixtures thereof. The polyester diols are typically based on adipates, for example butane-1,4-diol adipate and hexane-1,6-diol adipate and caprolactone. Cocondensates are likewise possible.

In the preparation of the TPUs, it is possible to use catalysts that are customary and known in the art. These may be tertiary amines, for example triethylamine, dimethylcyclohexylamine, N-methylmorpholine, N,N'-dimethylpiperazine, 2-(dimethylaminoethoxy)ethanol, diazabicyclo[2.2.2]-octane and the like and also in particular organic metal compounds such as titanic esters, iron compounds or tin compounds such as tin diacetate, tin dioctoate, tin dilaurate or the dialkyltin salts of aliphatic carboxylic acids, for example dibutyltin diacetate or dibutyltin dilaurate or the like. Preferred catalysts are organic metal compounds, especially titanic esters, iron compounds and tin compounds. The total amount of catalysts in the TPUs may generally be about 0% to 5% by weight, preferably 0% to 2% by weight, based on the total amount of TPUs.

In addition, the TPUs may contain auxiliaries and additives up to a maximum of 20% by weight, based on the total amount of TPUs. Typical auxiliaries and additives are pigments, dyes, flame retardants, stabilizers against aging and weathering effects, plasticizers, lubricants and demolding agents, fungistatics and bacteriostatics and fillers, and mixtures thereof.

Examples of further additives are lubricants, such as fatty acid esters, metal soaps thereof, fatty acid amides, fatty acid ester amides and silicone compounds, antiblocking agents, inhibitors, stabilizers against hydrolysis, light, heat and discoloration, flame retardants, dyes, pigments, inorganic and/or organic fillers, for example polycarbonates, and plasticizers and reinforcers. Reinforcers are especially fibrous reinforcing materials, for example inorganic fibers which are produced according to the prior art and may also have been sized. Further information about the auxiliaries and additives mentioned may be found in the specialist literature, for example in the monograph by J. H. Saunders and K. C. Frisch "High Polymers", Volume XVI, Polyurethane, Part 1 and 2, Interscience Publishers 1962 and 1964, in Taschenbuch für Kunststoff-Additive [Handbook of Plastics Additives] by R. Gächter and H. Müller (Hanser Verlag Munich 1990) or DE-A 29 01 774.

Suitable TPUs are for example available on the market under the trade names Desmopan™ Elastollan™, Pellethane™, Estane™, Morthane™ or Texin™.

The TPUs of the at least one outer layer a) which can be used with preference or according to the invention can be produced continuously by what is called the extruder process, for example in a multi-screw extruder, or by what is called the belt process. The above-described TPUs, optionally with the above-described auxiliaries and additives, can be dosed simultaneously, i.e. in the one-shot method, or successively, i.e. by a prepolymer method. Particular preference is given to the prepolymer method. The prepolymer here can either be initially charged batchwise or produced continuously in a portion of the extruder or in a separate upstream prepolymer unit, for example a static mixer reactor, e.g. Sulzer mixer.

The at least one outer layer a) is preferably in the form of a single-layer or multilayer TPU film and can be produced by melting the TPU granules preferred or according to the invention in a melting extruder and extruding same through a die to give a film in a thickness of ≥20 μm to ≤1000 μm, preferably of ≥50 μm to ≤800 μm, particularly preferably of ≥100 μm to ≤450 μm.

The at least one outer layer a) can be produced by the melt extrusion processes known to a person skilled in the art, the blown extrusion process and/or the cast extrusion process. For this purpose, the corresponding above-described TPU granules of the individual layers are melted in a melting extruder and extruded through a die to give a film in appropriate layer thicknesses.

In one embodiment, the outer TPU layer can also comprise a dye and/or a pigment for coloring the outer layer. Alternatively, a whole-area and/or partial-area print layer can be applied to the at least one outer TPU layer. The outer TPU layer is preferably transparent.

The at least one layer b) according to the invention contains a material selected from the group consisting of a polymer, a metal, a textile, a paper and a synthetic paper, or a combination of at least two of these, particularly preferably at least one textile, one paper and/or one synthetic paper.

The polymer can be a thermoplastic polymer selected from polymers of ethylenically unsaturated monomers and/or polycondensates of bifunctional reactive compounds and/or polyaddition products of bifunctional reactive compounds, or mixtures thereof. Particularly suitable thermoplastic polymers are polycarbonates or copolycarbonates based on diphenols, poly- or copolyacrylates and poly- or copolymethacrylates, for example and with preference polymethylmethacrylate (PMMA), poly- or copolymers with styrene, for example and with preference polystyrene (PS), acrylonitrile-butadiene-styrene (ABS) or polystyrene-acrylonitrile (SAN), thermoplastic polyurethanes, and polyolefins, for example and with preference polypropylene grades or polyolefins based on cyclic olefins (for example TOPAS™), poly- or copolycondensates of an aromatic dicarboxylic acid and aliphatic, cycloaliphatic and/or araliphatic diols having 2 to 16 carbon atoms, for example and with preference poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and with preference polycyclohexanedimethanolcyclohexanedicarboxylic acid (PCCD), polysulfones (PSU), polyvinyl halides, for example and with preference polyvinyl chloride (PVC), or mixtures thereof or blends of at least two of the above, particularly preferably one or more polycarbonates or copolycarbonates based on diphenols, poly- or copoly(meth)acrylates, poly- or copolycondensates of terephthalic acid or mixtures thereof or blends of at least two of the above.

The polymer can also be at least one thermosetting plastic. This at least one thermosetting plastic can be selected from polymers of ethylenically unsaturated monomers and/or polycondensates of trifunctional reactive compounds and/or polyaddition products of trifunctional reactive compounds, or mixtures of at least two of the above. These are, for example, curable molding compounds, formaldehyde molding compounds, for example phenoplasts, phenol-formaldehyde (PF), cresol-formaldehyde (CF), resorcinol-formaldehyde (RF), xylenol-formaldehyde (XF) resins, aminoplasts, for example urea-formaldehyde (UF), melamine-formaldehyde (MF), furan-formaldehyde (FF) resins, and further compositions such as prepregs, unsaturated polyester resins (UP), vinyl ester resins (VE), phenacrylate resins (PHA), epoxy resins (EP), diallyl phthalate resins and/or polydiallylphthalate (PDAP) resins, silicone resin (Si). Metals can be thin layers of steel, aluminum, copper, titanium or else nobler metals such as gold, silver, platinum and alloys of the above metals.

A textile can contain natural fibers (e.g. rock wool, cotton, flax, hemp, wool, silk, fur) or synthetic fibers (cellulose, polyacrylonitrile, polypropylene, polyester, polyamide, polyurethane, ceramic, glass, metal) and also optionally additionally non-textile raw materials (e.g. leather, feathers, metals).

A paper essentially comprises fibers of plant origin, whereas synthetic paper comprises exclusively plastics fibers, preferably polyethylene or polypropylene fibers. Layer b) preferably contains paper and/or synthetic paper. In particular for the use of the layer structure according to the invention in the field of security and identification documents, synthetic paper such as for example Teslin™ from PPG may be advantageous. The use of Teslin™ can be particularly advantageous as a carrier for chip modules and/or antennae, especially in security and identification documents, since these chip modules and/or antennae can readily be attached to Teslin™, for example by means of ultrasound methods.

In a preferred embodiment, the at least one layer b) comprises at least one dye and/or at least one pigment; the layer b) may optionally additionally also comprise a print layer applied over the whole area and/or over a partial area.

In another embodiment, the at least one layer b) comprises a print layer which can be applied over the whole area and/or over a partial area, and wherein the print layer points in the direction of the layer a).

The layer b) can have a thickness in the range from 40 μm to ≤800 μm, preferably from ≥80 μm to ≤500 μm, particularly preferably from ≥100 μm to ≤300 μm.

In a further embodiment, the layer structure comprises at least one further layer c) containing at least one thermoplastic polyurethane, which is formed at least in regions as a foam layer, and at least one further layer b') containing at least one material selected from the group consisting of a polymer, a metal, a textile, a paper and a synthetic paper, or a combination of at least two of these, particularly preferably at least one textile, one paper and/or one synthetic paper. Preferably, at least one component and/or one functional unit is positioned on the at least one further layer b'). Preferably, the at least one component and/or the functional unit is surrounded by the at least one layer c) at least in regions or is completely enveloped by the at least one layer c), preferably is completely enveloped by the at least one layer c).

Preferably, the at least one further layer b') has a cutout of any desired form, preferably in the form of a parallelogram which runs along a line of symmetry with respect to the length x or width y of the layer structure, particularly preferably the cutout in layer b') is arranged such that it corresponds in its form and position to the cutout in layer b).

Concerning the material, layer thicknesses and preferred embodiments of the at least one further layer b'), reference is made to the statements made above regarding layer b) in order to avoid unnecessary repetitions. Layer b') can be identical to or different from layer b) in terms of material and layer thickness. In a preferred embodiment, layers b) and b') comprise identical materials and layer thicknesses, preferably paper and/or synthetic paper.

Any desired number of components and/or functional units can be placed on layer b'). Examples of possible components and/or functional units are sensors, chip modules, data storage media, batteries, illumination units and/or else interconnected components and/or functional units. These components and/or functional units can have thicknesses in the range from 20 μm to 1500 μm.

The at least one component and/or functional unit is preferably placed on layer b') such that said at least one component and/or functional unit is at least partially covered by the at least one layer c), that is to say that the layers form the direct sequence a) b) c) b').

The at least one further layer c) containing at least one TPU is formed at least in regions as a foam layer. It is possible in principle to foam any thermoplastic polyurethanes (TPUs) by addition of suitable blowing agents. TPUs having a low hardness are preferably chosen. This minimizes the risk of damage to the electronic components in the course of laminating. The thermoplastic polyurethanes in layer c) with preference have a hardness of ≥60 Shore A according to DIN ISO 7619-1 to ≤95 Shore D according to DIN ISO 7619-1, preferably of ≥70 Shore A according to DIN ISO 7619-1 to ≤95 Shore A according to DIN ISO 7619-1.

The at least one layer c) with preference has a density prior to lamination of ≥0.2 to ≤0.9 g/cm$^3$, preferably of ≥0.3 to ≤0.8 g/cm$^3$, particularly preferably of ≥0.5 to ≤0.7 g/cm$^3$. The pores in the at least one layer c) preferably have a diameter prior to lamination of between 50 μm and 250 μm.

For production of the preferred foam layer c), a blowing agent is added to the TPU, preferably a blowing agent that eliminates $CO_2$ when heated and hence forms the foam layer. Suitable blowing agents are hydrogencarbonates, for example calcium hydrogencarbonate, potassium hydrogencarbonate and/or sodium hydrogencarbonate, and/or citrates, for example sodium citrate, potassium citrate, calcium citrate, magnesium citrate.

For production of the foam layer c), the granular TPU is typically mixed in the form of a masterbatch containing a blowing agent. This mixture is then compressed, melted and homogenized in an extruder. The temperatures of the melt in the extruder are above the decomposition temperature of the blowing agent and $CO_2$ is eliminated, which dissolves for the most part in the melt under the existing pressure. The melt is guided through an extrusion tool, which is also referred to as die. The pressure drop on exit from the die results in release of the $CO_2$ dissolved in the melt, producing finely distributed bubbles. This foamed melt web can be processed to give a foamed film by means of further processing by the flat film or blown film method.

In both methods, further layers comprising at least one thermoplastic polymer, preferably TPU, may be coextruded with or without blowing agents.

In a further embodiment, the layer structure comprises at least one further layer d) containing at least one thermoplastic polyurethane having a hardness of ≥60 Shore A according to DIN ISO 7619-1 to ≤95 Shore D according to DIN ISO 7619-1, the layers being arranged so as to result in the sequence a) b) d) c) b') or a) b) c) d) b'). In this embodiment, the at least one component and/or functional unit on layer b') is at least partially covered by layer c) or d).

In another embodiment, the layer structure comprises at least one further layer d') comprising at least one thermoplastic polyurethane having a hardness of ≥60 Shore A according to DIN ISO 7619-1 to ≤95 Shore D according to DIN ISO 7619-1, the layers being arranged so as to result in the sequence a) b) d) c) d') b') or a) b) d') c) d) b'). In this embodiment, the at least one component and/or functional unit on layer b') is at least partially covered by layer d') or d).

As already described above for layer a), the layers d) and d') can be produced by the melt extrusion processes known to a person skilled in the art, the blown extrusion process and/or the cast extrusion process. For this purpose, the corresponding above-described TPU granules of the individual layers can be melted in a melting extruder and extruded through a die to give a film in appropriate layer thicknesses.

To avoid repetition, reference is made to the above with regard to materials, composition, production and embodiments of the TPU of layers c), d) and d').

The at least one TPU of layers c), d) and d') can be independently identical or different; the at least one TPU is preferably identical.

The layer thicknesses of the layers d) and/or d') can independently have thicknesses of ≥5 μm to ≤150 μm, preferably of ≥10 μm to ≤120 μm, particularly preferably of ≥15 μm to ≤110 μm; these thicknesses are preferably identical.

In another embodiment of the invention, the at least one layer d) and/or d') can be used in the form of a single-layer or multilayer film.

In one embodiment of the invention, the at least one further layer c) and the at least one further layer d) are present in the layer structure in the form of a multilayer film c) d), preferably in the form of a multilayer coextruded film c) d).

In another embodiment, the at least one layer c), the at least one further layer d) and the at least one further layer d') are present in the layer structure in the form of a multilayer film d) c) d'), with the at least further layers d) and d') enclosing the at least one layer c). This is preferably a multilayer coextruded film having at least the layer sequence d) c) d'), particularly preferably in the form of a three-layer coextruded film of the layer sequence d) c) d').

The layers c), optionally d) and optionally d') can have a total layer thickness prior to lamination of ≥100 to ≤1200 μm, preferably of ≥300 to ≤800 μm, particularly preferably of ≥350 to ≤550 μm. The thickness of the layer c) can in particular be selected such that this layer c) completely envelops the component and/or the functional unit.

In particular when using the layer structure according to the invention for the production of hinges, preferably book covers, very particularly for the production of book covers of security and identification documents, further layers can be constructed directed inwards, i.e. the inner side of the hinge, preferably of the book cover. For example, a further layer a') can be laid on top of layer b'), followed by a further layer b"), preferably paper and/or synthetic paper, which is preferably printed, so that the following exemplary layer structures can be realized; layer a') acts as an adhesive layer to join layer b"), preferably paper, to the rest of the structure:

a) b) d) c) b') a') b")

a) b) c) d) b') a') b")

a) b) d) c) d') b') a') b")

a) b) d') c) d) b') a') b")

The invention further provides a method for producing a multilayer laminate comprising at least the steps i) providing a layer structure according to the invention as described above with the corresponding embodiments and preferred ranges;

ii) laminating the layer structure from step i) at a temperature of ≥80° C. to ≤220° C. and with a pressure of ≥2 N/cm$^2$ to ≤500 N/cm$^2$, preferably laminating with an engraved lamination plate, particularly preferably with an engraved lamination plate comprising a non-stick coating.

For the production of hinges, in particular for the production of book covers, very particularly for the production of book covers for security and identification documents, the method can also comprise the following steps after step ii):

iii) folding the layer structure, preferably along the cutout in layer b) and possibly in layer b');

iv) pressing the layer structure after step iii) along the cutout in layer b) and possibly in layer b'), preferably pressing between two rollers, rolls and/or plates, at a temperature which is ≥0.5° C. to ≤150° C., preferably ≥1° C. to ≤50° C., particularly preferably ≥1° C. to ≤20° C., above the softening temperature of the outer TPU layer a), for a period of 2 to 20 seconds, preferably of 2 to 10 seconds, particularly preferably of 2 to 5 seconds;

v) removing the layer structure from the press.

In step iv), pressure is exerted on the laminated layer structure in the region of the fold by means of temperature-controlled rollers, rolls and/or plates in order to permanently deform the laminated layer structure. This creates the desired plane position for the laminated layer structure when it is closed. In particular for the use of the layer structure according to the invention for the production of security and identification documents, the maximum open position of a closed layer structure according to ISO IEC 18745-1 should not exceed a height of 10 mm. In particular when exerting pressure on the layer structure in the region of the fold for a period of 2 to 20 seconds, in particular of 2 to 5 seconds, and at a temperature which is ≥0.5° C. to ≤150° C., preferably ≥1° C. to ≤50° C., particularly preferably ≥1° C. to ≤20° C., above the softening temperature of the outer TPU layer a), a self-closing function of the folded layer structure can be realized which may be advantageous in particular when producing security and identification documents as a passport book cover.

In a preferred embodiment of the method, in particular a method for producing a book cover, particularly preferably a method for producing a book cover for security and identification documents, the method further comprises the steps vi) introducing one or more additional insert sheets into the book cover;

vii) introducing stitching through the book cover and the insert sheets or fastening the insert sheets by means of adhesive strips.

Lamination with engraved lamination plates can make it possible to introduce the desired tactile properties on the outside of the layer structure according to the invention. Preference is given to using lamination plates with a non-stick coating to prevent bonding of the outer TPU layer to the lamination plate.

Customary non-stick coatings for metals can be Teflon layers or very thin crystal layers applied to metals under reduced pressure. For example, Teflon coatings from Adelhelm, or crystal coatings from Plascotec (Plascosam™ coating). The desired grain of the external layer is generated by the corresponding grain of the lamination plate. During the lamination process, the grain is transferred from the plate to the TPU layer. The transfer is particularly accurate even with fine engravings, so that finely matted sheets produce finely matted TPU outer plies and glossy sheets lead to glossy TPU outer plies. In addition to the visual appearance, the grain of the surface also modifies the tactile properties of the passport book cover by retaining the same TPU layer. For instance, glossy surfaces feel tacky, matted surfaces or surfaces provided with a leather grain feel similar to leather surfaces.

The invention further provides a laminate comprising the above-described layer structure according to the invention.

The invention also provides for the use of the above-described layer structure according to the invention for the production of a hinge, preferably for the production of a multilayer book cover, in particular a book cover for security and identification documents.

It is also possible to use the laminate according to the invention for the production of a hinge for example for bags, purses or wallets, pencil cases, card holders.

EXAMPLES

Raw Materials and Materials of the Individual Layers

Layer a)

The external TPU layer of a passport book cover (FIG. 1, layer a) was produced using an aliphatic polycaprolactone-based TPU having a Shore A hardness of 85-90 according to ASTM D2240 or DIN ISO 7619-1. The melt extrusion process was used to produce the TPU film. The TPU granules were melted in a melting extruder and extruded through a die to give a film in a thickness of 150 μm.

Layer b) and b')

For the layers b) and b') a 250 μm thick synthetic paper from PPG, sold under the trade name Teslin™ was used.

Film 1: 3-Layer Film with the Layer Sequence dcd')

A three-layer thermoplastic polyurethane film with a thickness of 600 m was produced in the blown coextrusion process. The film consisted of three layers: the two outer plies d) each made of 100 μm compact thermoplastic polyurethane and the 400 m thick middle layer c) made of foamed thermoplastic polyurethane. The thermoplastic polyurethane used was a TPU based on polytetrahydrofuran (molecular weight 2000), methylene diphenylene 4,4'-diisocyanate and butane-1,4-diol as chain extender with a Shore A hardness of 87, measured to DIN ISO 7619-1, corresponding to a Shore D hardness of 36, measured to DIN ISO 7619-1, a density of 1.12 g/cm$^3$ measured to DIN EN ISO 1183-1A and a melt flow index (MFI) of 30 g/10 min measured at 190° C./21.6 kg (DIN ISO 1133).

For the foaming of the middle layer c), 5% by weight of Hydrocerol™ CF20 from Clariant was added to the TPU, which releases $CO_2$ in the course of heating of the film in the extruder and hence foamed the TPU on exit from the die.

Film 2: 2-Layer Film with the Layer Sequence (g-h) as an Alternative Layer a)

Layer (g-h)

Figure 6:
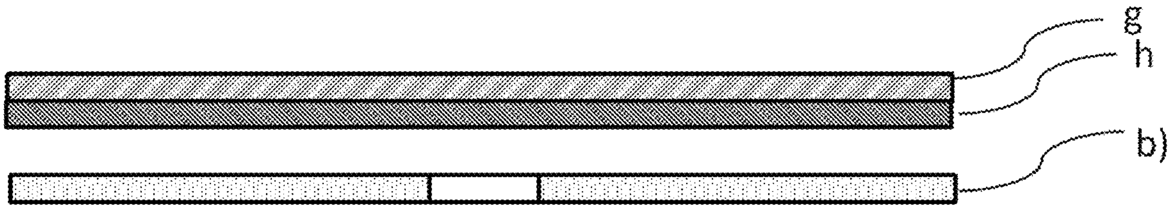
FIG. 6 shows the layer sequence of example 3 before lamination.

The external layer a) in the form of a layer sequence (g-h) of a passport book cover as shown in FIG. 6 was produced using a polyether block amide (PEBA) for the layer (g) together with a TPU for the layer (h). The melt coextrusion process was used to produce layer a) in the form of the two-layer film (g-h). The PEBA granules and the TPU granules were melted in separate melting extruders at 190° C. to 200° C., preferably at 200° C., and extruded through a coextrusion die to give a film in a thickness of 150 μm.

Example 1: Passport Book Cover with TPU Exterior Layer with Coloring and Lettering Layer b) was printed in color over the whole area of one face. Printing was performed by means of toner printing on an MP C3003 model printer from the manufacturer Ricoh. In addition to the color-imparting whole-area printing, the lettering "Passport" was printed on layer b) which had already been printed in color.

The layer a) was arranged such that it was in contact with the printed side of the layer b), so that the print was visible through the transparent layer a).

A line, where the passport book cover was intended to be folded later, was marked on layer b). The material of layer b) was removed along these fold lines in a width of 6 mm. For this, layer b) was placed in a Plator press and a 6 mm wide strip of material was stamped out along the fold line by means of a steel rule die.

Layers a) and b) were stacked according to FIG. 1) and fixed in their position by means of spot welding at the four sheet corners.

The stack of layers a) and b) was laminated on a Bürkle lamination press. The lamination plate that was in contact with layer a) was a lamination plate engraved over the whole area and having a non-stick coating. The engraving corresponded to a leather grain. The corresponding plate was supplied by the company 4-Plate.

Lamination Parameters:

Preheating of the press to 150° C.

Pressing for 5 minutes with a pressure of 20 N/$cm^2$.

Cooling under a pressure of 150 N/$cm^2$ until a temperature of 38° C. has been reached, and opening the press.

After removal of the laminate, the side which had been in contact with the engraved plate exhibited a uniform leather grain which was also able to be perceived as leather. The adhesion of all layers was particularly good, and hence a non-destructive separation and reuse of the layers was not possible. The separation of the layers was tested by attempting to separate the individual layers from each other by hand. The layers could only be separated using appropriate tools (scissors, pliers), which resulted in damage to the layers. The color print remained undamaged after the lamination and appeared with good brilliance through the transparent exterior layer a).

Figure 2:
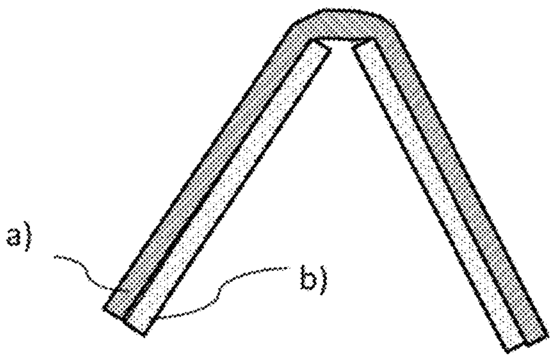
FIG. 2 shows the folded laminate from example 1.

A passport book cover was stamped out from the laminate in the desired size. The stamped-out book cover was then folded along the stamped-out cutout of the fold line. The folded side of the book cover was then clamped in a roll laminator in a width of 4 mm along the entire length of the book cover. The book cover was clamped for a period of 3 seconds at a roller temperature of 130° C. The book cover was then removed from the rollers. This enabled a memory effect to be achieved in ply a): If the original form of the book cover was disturbed by opening the book cover, it closed again automatically (FIG. 2).

The book cover had a flat position of less than 5 mm, thus significantly better than the minimum value specified in ISO 18745-1.

Example 2: Passport Book Cover with Coloring and Lettering and Integrated Chip Module and Antenna Layer b) was printed in color over the whole area of one face. Printing was performed by means of toner printing on an MP C3003 model printer from the manufacturer Ricoh. In addition to the color-imparting whole-area printing, the lettering "Passport" was printed on layer b) which had already been printed in color.

The layer a) was arranged such that it was in contact with the printed side of the layer b), so that the print was visible through the transparent layer a).

Figure 3:
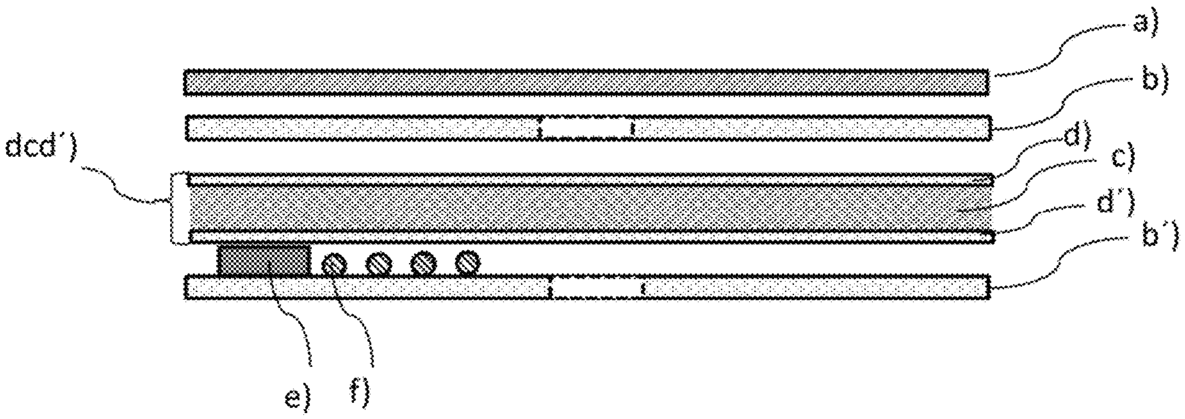
FIG. 3 shows the layer sequence of example 2 before lamination.

An antenna made of copper wire was placed on a further (unprinted) layer b') (see also FIG. 3). The wire had a diameter of 80 μm and was formed into the form of an antenna f) in accordance with the standard ISO 14443 for contactless data transfer. A chip module e), suitable for data storage and contactless data transfer in accordance with the standard ISO 14443, was contacted with the ends of the antenna.

A line, where the passport book cover was intended to be folded, was marked on each of layers b) and b'). The material of layer b) and b') was removed along the fold line in a width of 6 mm. For this, layers b) and b') were placed in a Plator press and a 6 mm wide strip of material was stamped out along the fold line by means of a steel rule die.

The layers were stacked according to FIG. 3 and fixed in their position by means of spot welding at the four sheet corners.

The stack of films according to FIG. 3 was laminated on a Bürkle lamination press. The lamination plate that was in contact with layer a) was a lamination plate engraved over the whole area and having a non-stick coating. The engraving corresponded to a leather grain. The corresponding plate was supplied by the company 4-Plate.

Lamination Parameters:

Preheating of the press to 150° C.

Pressing for 5 minutes with a pressure of 20 N/$cm^2$.

Cooling under a pressure of 150 N/$cm^2$ until a temperature of 38° C. has been reached, and opening the press.

After removal of the laminate, the side which had been in contact with the engraved plate exhibited a uniform leather grain which was also able to be perceived as leather. The adhesion of all layers was particularly good, and hence a non-destructive separation and reuse of the layers was not possible. The separation of the layers was tested as described in example 1. The color print remained undamaged after the lamination and appeared with good brilliance through the transparent exterior layer a). The passport book cover further had a consistently homogeneous thickness distribution. Unevennesses due to the antenna that had been incorporated by lamination and the chip module were taken up and compensated by the ply dcd'), as shown schematically in FIG. 4.

Figure 5:
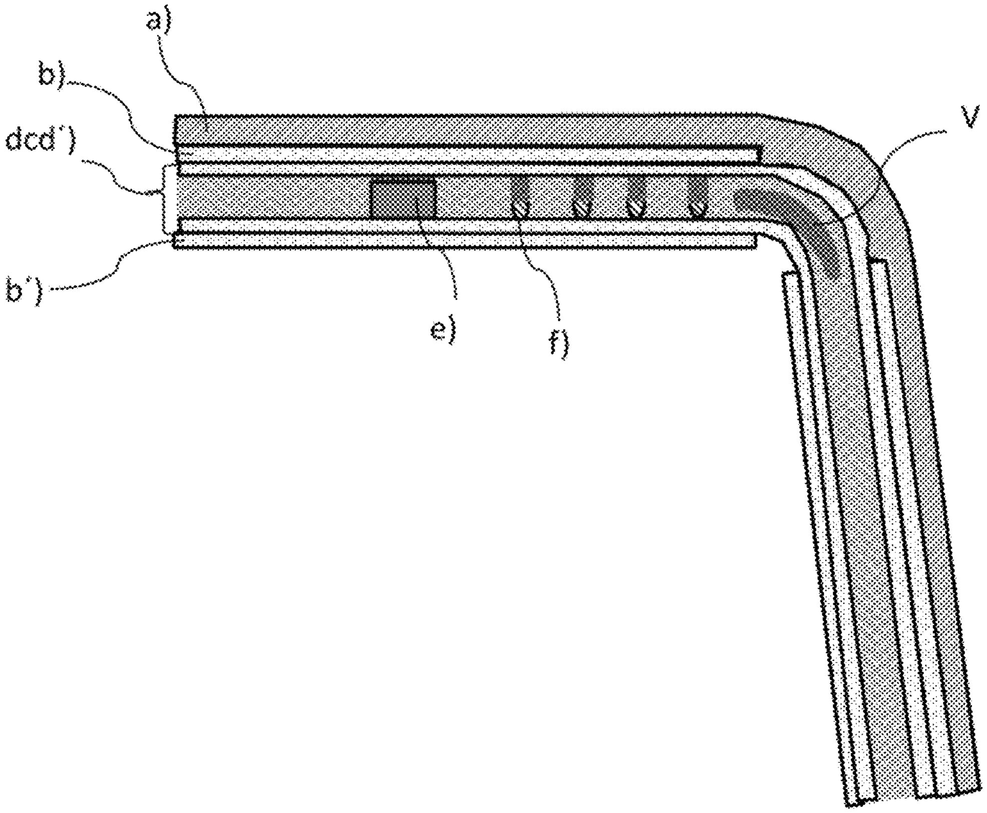
FIG. 5 shows the folded laminate from example 2.

The laminates were stamped in the size of a passport book cover. The stamped-out book cover was then folded along the stamped-out cutout of the fold line. The folded side of the book cover was then clamped in a roll laminator in a width of 4 mm along the entire length of the book cover. The book cover was clamped for a period of 3 seconds at a roller temperature of 130° C. The book cover was then removed from the rollers. This enabled a memory effect to be achieved in ply a) and dcd'): If the original form of the book cover was disturbed by opening, it closed again automatically (FIG. 5).

The book cover had a flat position of less than 5 mm, thus significantly better than the minimum value specified in ISO 18745-1.

Example 3: Passport Book Cover with PEBA and TPU Exterior Layer with Coloring and Lettering Layer b) was printed in color over the whole area of one face. Printing was performed by means of toner printing on an MP C3003 model printer from the manufacturer Ricoh. In addition to the color-imparting whole-area printing, the lettering “Passport” was printed on layer b) which had already been printed in color.

Layer a), in the form of a layer sequence g-h) (consisting of a film g) and a film h), as described for film 2: 2-layer film with the layer sequence (g-h)), was arranged such that it was in contact with the printed side of the layer b), so that the print was visible through the transparent layer g-h).

A line, where the passport book cover was folded later, was marked on layer b). The material of layer b) was removed along these fold lines in an area with a width of 6 mm. For this, layer b) was placed in a Plator press and a 6 mm wide strip of material was stamped out along the fold line by means of a steel rule die.

Layers g-h) and b) were stacked according to FIG. 6) and fixed in their position by means of spot welding at the four sheet corners.

The stack of layers g-h) and b) was laminated on a Bürkle lamination press. The lamination plate that was in contact with layer g-h) was a lamination plate engraved over the whole area and having a non-stick coating. The engraving corresponded to a leather grain. The corresponding plate was supplied by the company 4-Plate.

Lamination Parameters:

Preheating of the press to 150° C.

Pressing for 5 minutes with a pressure of 20 $N/cm^2$.

Cooling under a pressure of 150 $N/cm^2$ until a temperature of 38° C. has been reached, and then opening the press.

After removal of the laminate, the side which had been in contact with the engraved plate exhibited a uniform leather grain which was also able to be perceived as leather. The color print remained undamaged after the lamination and appeared with good brilliance through the transparent exterior layer g-h). The adhesion of all layers was particularly good, and hence a non-destructive separation and reuse of the layers was not possible. The separation of the layers was tested by attempting to separate the individual layers from each other by hand. The layers could only be separated using appropriate tools (scissors, pliers), which resulted in damage to the layers.

Figure 7:
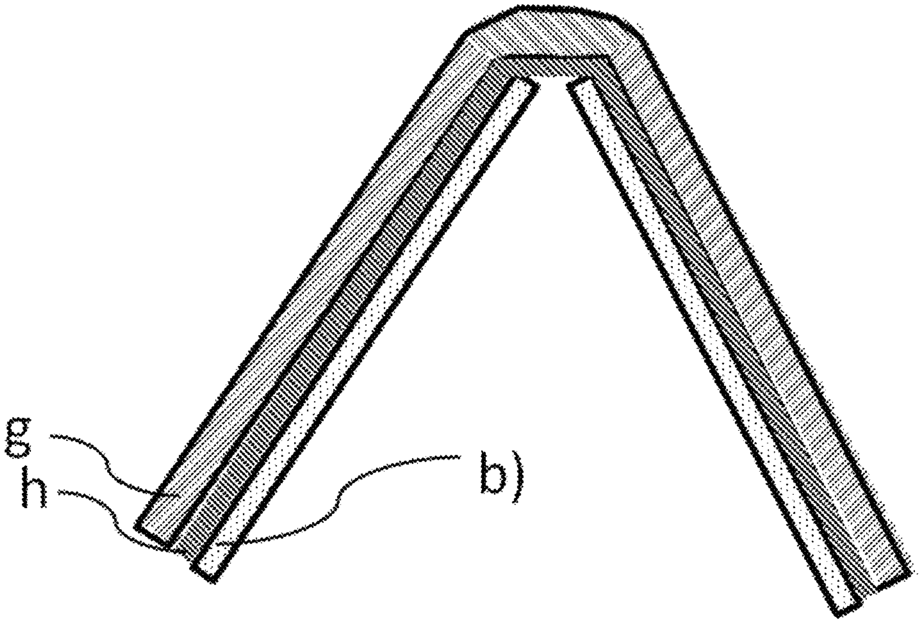
FIG. 7 shows the folded laminate from example 3.

A passport book cover was stamped out from the laminate in the desired size. The stamped-out book cover was then folded along the stamped-out cutout in the fold line. The folded side of the book cover was then clamped in a roll laminator in a width of 4 mm along the entire length of the book cover. The book cover was clamped for a period of 3 seconds at a roller temperature of 130° C. The book cover was then removed from the rollers. This enabled a memory effect to be achieved in ply g-h): If the original form of the book cover was altered or disturbed by opening the book cover, it closed again automatically. A slightly opened book cover is shown in FIG. 7 with the layers g-h) and d), as described above.

The book cover had a flat position of less than 5 mm, thus significantly better than the minimum value of <10 mm specified in ISO 18745-1, measurement being effected in accordance with method 9.6 of the standard.

Example 4: Passport Book Cover Made of PEBA and TPU with Coloring and Lettering and Integrated Chip Module and Antenna In this example 4, a passport book cover having a structure as shown in FIG. 3 was manufactured, where, instead of the layer a), a layer g-h) consisting of the films g) and h) as described above was brought into contact with the layer b), the film h) pointing in the direction of the layer b).

For this, layer b) was printed in color over the whole area of one face. Printing was performed by means of toner printing on an MP C3003 model printer from the manufacturer Ricoh. In addition to the color-imparting whole-area printing, the lettering “Passport” was printed on layer b) which had already been printed in color.

The layer g-h) was arranged such that it was in contact with the printed side of the layer b), so that the print was visible through the transparent layer g-h).

An antenna made of copper wire was placed on a further (unprinted) layer b') (see also FIG. 3, with layer a) having been replaced by layer g-h)). The wire had a diameter of 80 μm and was formed into the form of an antenna f) in accordance with the standard ISO 14443 for contactless data transfer. A chip module e), suitable for data storage and contactless data transfer in accordance with the standard ISO 14443, was contacted with the ends of the antenna.

A line, where the passport book cover was intended to be folded, was marked on each of layers b) and b'). The material of layer b) and b') was removed along the fold line in a width of 6 mm. For this, layers b) and b') were placed in a Plator press and a 6 mm wide strip of material was stamped out along the fold line by means of a steel rule die.

The layers were stacked according to FIG. 3 (with layer a) having been replaced by layer g-h)) and fixed in their position by means of spot welding at the four sheet corners.

The film stack according to FIG. 3 (with layer a) having been replaced by layer g-h)) was laminated on a Bürkle lamination press. The lamination plate that was in contact with layer g-h) was a lamination plate engraved over the whole area and having a non-stick coating. The engraving corresponded to a leather grain. The corresponding plate was supplied by the company 4-Plate.

Lamination Parameters:

Preheating of the press to 150° C.

Pressing for 5 minutes with a pressure of 20 $N/cm^2$.

Cooling under a pressure of 150 $N/cm^2$ until a temperature of 38° C. has been reached, and opening the press.

After removal of the laminate, the side which had been in contact with the engraved plate exhibited a uniform leather grain which was also able to be perceived as leather. The adhesion of all layers was particularly good, and hence a non-destructive separation and reuse of the layers was not possible. The separation of the layers was tested as described in example 1. The color print remained undamaged after the lamination and appeared with good brilliance through the transparent exterior layer g-h). The passport book cover further had a consistently homogeneous thickness distribution. Unevenness due to the antenna that had been incorporated by lamination and the chip module are taken up and compensated by the ply dcd'), as shown schematically in FIG. 4.

The laminates were stamped in the size of a passport book cover. The stamped-out book cover was then folded along the stamped-out cutout of the fold line. The folded side of the book cover was then clamped in a roll laminator in a width of 4 mm along the entire length of the book cover. The book cover was clamped for a period of 3 seconds at a roller temperature of 130° C. The book cover was then removed from the rollers. This enabled a memory effect to be achieved in ply g-h) and dcd'): If the original form of the book cover was altered by opening, it closed again automatically.

The book cover had a flat position of less than 5 mm, thus significantly better than the minimum value specified in ISO 18745-1.

Reference numerals of FIGS. 1 to 7:

a) 150 μm TPU layer a)

b) 250 μm thick synthetic paper (Teslin™ from PPG) printed over the whole area of one face.

b') 250 μm thick synthetic paper (Teslin™ from PPG), unprinted dcd') film 1 as TPU three-layer film with the layer sequence dcd'), the layer c) taking the form of a foam layer.

e) chip module f) antenna g) PEBA film h) TPU film

V) compressed foam

FIG. 1 shows the layer sequence of example 1 before lamination.

FIG. 2 shows the folded laminate from example 1.

FIG. 3 shows the layer sequence of example 2 before lamination.

Figure 4:
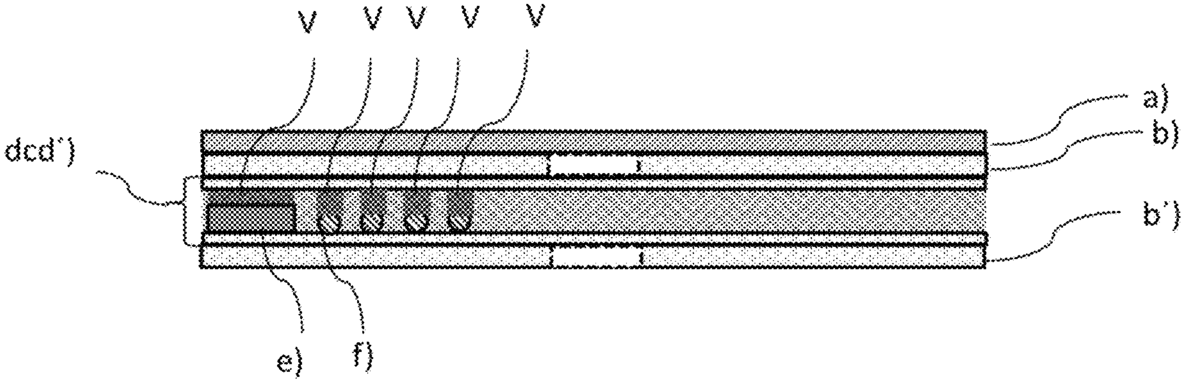
FIG. 4 shows the layer sequence of example 2 after lamination.

FIG. 4 shows the layer sequence of example 2 after lamination.

FIG. 5 shows the folded laminate from example 2.

FIG. 6 shows the layer sequence of example 3 before lamination.

FIG. 7 shows the folded laminate from example 3.

The invention claimed is:

1. A hingeable layer structure comprising:

layers arranged in a sequence of a/b/d/c/d'/b', wherein only one of layer d and layer d' is present or both d and layer d' are present in the layer structure, wherein layer a is an outermost layer containing at least one thermoplastic elastomer comprising at least 50 wt % polyurethane, and layer a contacts layer b, layers b and b' contains at least one material selected from the group consisting of a polymer, a metal, a textile, a paper, a synthetic paper, or a combination thereof, and layer b either (i) contacts layer d if layer d is present, or (ii) contacts layer c if layer d is not present, layer c contains at least one thermoplastic polyurethane which is formed at least in regions as a foam layer, and layer c either (i) contacts layer d' if layer d' is present, or (ii) contacts layer b' if layer d' is not present, layer(s) d and/or d' contain(s) at least one thermoplastic polyurethane having a hardness of ≥60 Shore A to ≤95 Shore D according to DIN ISO 7619-1, wherein layer d, if present, contacts layer c and layer d', if present, contacts layer b', and layer b comprises a cutout of any desired form, wherein layer a, layer c, and layer(s) d and/or d' extend across the cutout defining a hinge region.

2. The layer structure of claim 1, wherein layer d' is present.

3. The layer structure of claim 1, wherein both layers d and d' are present.

4. The layer structure of claim 1, layer b' also comprising a cutout of any desired form, the cutout of layer b' being aligned and overlapping in a thickness direction of the layer structure with the cutout of layer b.

5. The layer structure of claim 1, wherein the cutout in layer b has the form of a parallelogram having its major axis of running parallel to a line of symmetry of a length or a width of the layer structure.

6. The layer structure of claim 1, wherein the cutout in layer b comprises a dimension of ≥0.1 mm to ≤100 mm.

7. The layer structure of claim 1, wherein the cutout of layer of layer b is such that layer b is arranged in the form of at least two sections, with first and second sections flanking opposing lateral sides of the cutout.

8. The layer structure of claim 4, wherein the cutouts of layers b and b' are such that each of layer b and layer b' is arranged in the form of at least two sections, with first and second sections flanking opposing lateral sides of the corresponding cutout.

9. The layer structure of claim 1, wherein layers b and b' each comprise the synthetic paper.

10. The layer structure of claim 1, wherein layer b comprises at least one dye and/or pigment.

11. The layer structure of claim 10, wherein layer b further comprises a print layer applied over at least a partial area.

12. The layer structure as claimed in of claim 1, wherein the least one thermoplastic elastomer is a thermoplastic polyurethane having a hardness of ≥60 Shore A according to DIN ISO 7619-1 to ≤95 Shore D according to DIN ISO 7619-1.

13. The layer structure of claim 1, wherein layer a has a thickness in the range of ≥20 μm to ≤1000 μm.

14. The layer structure of claim 1, further comprising layer a' and layer b", wherein:

layer a' contains at least one thermoplastic elastomer comprising at least 50 wt % polyurethane, and layer a contacts layer b', and layer b" contains at least one material selected from the group consisting of a polymer, a metal, a textile, a paper, a synthetic paper, or a combination thereof, and layer b" contacts layer a'.

15. The layer structure of claim 1, further including at least one component and/or at least one functional unit positioned on layer b'.

16. The layer structure of claim 15, wherein the at least one component and/or at least one functional unit is at least partially covered by the foam layer of layer c.

17. The layer structure of claim 16, wherein the at least one component and/or at least one functional unit is an electronic comprising a sensor, chip module, data storage media, battery, and/or illumination unit.

18. A laminate comprising the layer structure of claim 1.

19. A multilayer book cover comprising the layer structure of claim 1.

20. A security or identification document comprising the multilayer book cover of claim 19.

* * * * *